United States Patent Office 2,775,625
Patented Dec. 25, 1956

2,775,625

INHIBITING POLYMERIZATION OF MONOMERIC VINYLIDENE CHLORIDE

John H. Reilly and Marion R. Rector, Midland, Mich., assignors to The Dow Chemical Company, Midland, Mich., a corporation of Delaware No Drawing. Application June 17, 1953, Serial No. 362,386

4 Claims. (Cl. 260—652.5)

This invention relates to a composition of matter consisting essentially of monomeric vinylidene chloride and an agent to prevent the polymerization of the monomer.

It is known that monomeric vinylidene chloride polymerizes readily, and that it is necessary to introduce an inhibitor into the monomer if the latter is to be stored or shipped from its point of manufacture to a point of use. When the uninhibited monomer contains some water, and especially when it is exposed to air, polymerization starts soon after the monomer is made and may be accompanied by corrosion of ferrous metal containers, due to hydrolytic or oxidative degradation of vinylidene chloride with liberation of hydrogen chloride or other acidic compounds.

Many compounds and classes of compounds have been proposed and used heretofore for the inhibition of vinylidene chloride polymerization. Chief among these have been phenolic compounds and amino compounds. The most satisfactory agents have been common phenol and tertiarybutyl catechol. It is necessary to separate the monomer from the inhibitor before the monomer can be converted to a useful polymer. It has been found that, if enough of the usual phenolic inhibitor is present to prevent polymerization during prolonged storage, small but objectionable amounts of the phenol vapors accompany the vinylidene chloride during distillation. If, on the other hand, the amount of phenolic inhibitor is kept small enough so that no significant amount would be carried over during distillation, there is not the required degree of inhibition, and the monomer begins to polymerize in storage. Thus, as much as 0.5 to 1.0 percent of phenol or 0.03 to 0.1 percent of tertiarybutyl catechol does not completely inhibit polymerization of vinylidene chloride, and distillation of the monomer from mixtures with these inhibitors in the stated quantities results in objectionable traces of phenolic matter being carried into the distillate. In order to detect the presence of small amounts of phenols in the monomer, careful chemical tests are required. It is usually necessary to wash last traces from the monomer and then to redistill the monomer before polymerization to prevent the production of polymer of low molecular weight. When the usual phenol-inhibited monomer is exposed to light, as in the sight glasses on storage tanks, the inhibitor fails to prevent polymerization in the lighted zone.

It is the principal object of this invention to provide a composition of matter consisting essentially of monomeric vinylidene chloride and an agent which completely inhibits polymerization of the monomer when present therein in small amounts, is easily and completely separated from the monomer when desired, and whose presence in the monomer can readily be detected, even in minute traces. Specifically, it is an object to provide a highly effective inhibitor to prevent polymerization of vinylidene chloride.

The new compositions of the present invention, whereby the foregoing and related objects are realized, consist essentially of monomeric vinylidene chloride and, as a stabilizer therefor, from 60 to 1000 parts by weight, per million parts of the monomer, i. e., from 0.006 to 0.1 percent by weight, of a monoazo dye having a beta-naphthol component. Examples of such dyes, all of which are effective inhibitors, are:

| Dye name | Diazotized compound coupled with beta-naphthol |
|---|---|
| Oil Red O | ortho-toluidine. |
| Oil Orange 2311 | aniline. |
| Oil Scarlet 6G | xylidine. |
| Azo Orange LO | ortho-nitroaniline. |
| m-Nitraniline Orange | meta-nitroaniline. |
| Para Red | para-nitroaniline. |
| Permanent Red 4B | meta-nitro-para-toluidine. |
| Pigment Red B | alpha-naphthylamine. |
| Janus Blue | safranin. |

Other monoazo dyes with beta-naphthol components, but whose composition cannot be learned from available publications, include Oil Blue MG and Oil Green M255, both of which are effective in the present compositions.

Such dyes are soluble in monomeric vinylidene chloride and their presence in the monomer is evidenced by the color of the solution when there is as little as 1 part of the dye by weight in each million parts of the monomer. The dyes are completely non-volatile at any temperature to which the monomer will be subjected during distillation, and complete separation to provide a readily polymerized monomer is easily achieved. The stated class of dyes effectively inhibits polymerization, as may be seen from the following example.

In an accelerated test, several samples of a freshly prepared, water-wet monomeric vinylidene chloride were used to dissolve 100 or 200 parts per million of one of the agents listed below. The resulting samples were stored in daylight in contact with a standard amount of iron wire, in the presence of air, in a sealed glass bottle. All samples were subjected to a temperature of 55.5° C. for the duration of the test (30 days). Frequent observations were made to determine the elapsed time from the start of the test to (a) appearance of haze in the monomer, (b) appearance of an insoluble polymeric floc in the monomer, and (c) appearance of separated heavy polymer. At the temperature employed, each day was the equivalent of about 8 days at a more normal storage temperature of 25° C. Haze appears at about 1 p. p. m. of polymer, floc at about 100 p. p. m., and heavy polymer at 1000 or more p. p. m.

| Test material | p. p. m. | Days to noticeable— | | |
|---|---|---|---|---|
| | | Haze | Floc | Heavy polymer |
| None (control) | | <1 | <1 | 1 |
| Hydroxyazobenzene | 100 | <1 | <1 | 1 |
| Do | 200 | <1 | <1 | 1 |
| Beta-naphthol | 100 | <1 | <1 | 1 |
| Do | 200 | <1 | <1 | 1 |
| Oil Red O | 100 | 12 | 17 | X |
| Do | 200 | 18 | X | X |
| Oil Orange 2311 | 100 | 2 | 4 | X |
| Do | 200 | 12 | X | X |
| Oil Scarlet 6G | 100 | 1 | X | X |
| Do | 200 | 1 | X | X |
| Oil Blue MG | 100 | 12 | 22 | X |
| Do | 200 | 12 | 25 | X |
| Oil Green M255 | 100 | 11 | 23 | X |
| Do | 200 | 12 | 25 | X |

Note.—X represents "none visible in 30 days."

It is apparent that, even under the adverse conditions, with exposure to light, air and water, the compositions of the present invention will show no floc formation at normal storage temperatures for periods ranging from 4 to 30 weeks or more, far exceeding normal requirements. At the end of the 30-day accelerated test, the control sample and those containing hydroxyazobenzene and beta-naphthol had corroded the iron wire badly, and these samples were very acid. The samples containing the dyes showed no attack on the iron, and were at most only slightly acid.

In normal storage in the dark, water-wet monomeric vinylidene chloride is infinitely more prone to acid formation, both in the presence and the absence of air, than are such common commercial chlorinated aliphatic hydrocarbons as chloroform, carbon tetrachloride and perchloroethylene. This is evident from tests carried out at room temperature, in the dark, for 95 days with equal volumes (100 ml.) of the several materials listed below, each in contact with 25 ml. of pure water and each washed with an additional 25 ml. of water before titration with standard alkali at the end of the test. Each sample was subjected to distillation, and the amount of non-volatile residue was determined. The acidity developed during wet storage is reported as ml. of 0.1 N NaOH required for neutralization and the residue (N. V. R.) is reported in grams.

| Chlorinated Hydrocarbon | Air Present | | Air Absent | |
|---|---|---|---|---|
| | Acidity | NVR | Acidity | NVR |
| Chloroform | 0.0 | 0 | 0.0 | 0 |
| Carbon tetrachloride | 0.0 | 0 | 0.0 | 0 |
| Perchloroethylene | 0.0 | 0 | 0.0 | 0 |
| Vinylidene chloride | 84.1 | 108 | 10.9 | 74.2 |

To determine the effective range of dye concentrations for use with monomeric vinylidene chloride, a series of tests was carried out as in the first table herein, using from 10 to 3000 parts of dye per million parts of monomer, in wet storage, in daylight, at 55° C. and in the presence of iron wire. For comparison, a similar series was run using phenol as the inhibitor and another using p-tertiarybutyl catechol. The results appear below:

| Test Material | p. p. m. | Days to Noticeable— | | | Percent Polymer or residue | Days | Iron Corrosion |
|---|---|---|---|---|---|---|---|
| | | Haze | Floc | Heavy Polymer | | | |
| Oil Red O | 10 | | | 1 | >5 | 1 | Slight. |
| Do | 20 | | | 3 | >5 | 3 | Do. |
| Do | 40 | 3 | 7 | X | 1.8 | 33 | Do. |
| Do | 60 | 5 | 11 | X | 0.9 | 33 | Do. |
| Do | 100 | 12 | 17 | X | trace | 30 | Very slight. |
| Do | 200 | 18 | X | X | trace | 30 | Do. |
| Do | 300 | X | X | X | none | 30 | Do. |
| Do | 500 | X | X | X | none | 30 | Do. |
| Do | 1,000 | X | X | X | none | 30 | Do. |
| Do | 3,000 | X | X | X | none | 30 | Do. |
| Phenol | 5,000 | 1 | 1 | X | 0.98 | 30 | Slight. |
| Do | 6,000 | 1 | 1 | X | 0.2 | 30 | Do. |
| Do | 7,000 | 1 | 9½ | X | 0.07 | 30 | Do. |
| Do | 8,000 | 1 | 9½ | X | 0.06 | 30 | Do. |
| Do | 9,000 | 1 | 9½ | X | 0.05 | 30 | Do. |
| Do | 10,000 | 1 | 9½ | X | 0.04 | 30 | Do. |
| p-ter.butyl catechol | 30 | 5 | 6 | X | 0.02 | 30 | Heavy. |
| Do | 50 | 6 | 13 | X | 0.01 | 30 | Do. |
| Do | 100 | 6 | 13 | X | 0.009 | 30 | Light. |
| Do | 150 | 13 | 26 | X | 0.002 | 30 | Do. |
| Do | 300 | 13 | X | X | 0.012 | 30 | Do. |
| Do | 600 | 19 | X | X | 0.013 | 30 | Black Coat. |
| Do | 1,000 | 26 | X | X | 0.04 | 30 | Do. |

NOTE.—X represents "none visible in 30 days."

It is seen that the present dye-containing compositions, with 60 or more parts per million of dye, are more stable than any of the phenol inhibited samples containing 5000 p. p. m. (0.5 percent) or more of phenol. It is noted, also, that the new compositions, at all tested dye concentrations, are less corrosive to iron than those inhibited with like amounts of tertiarybutyl catechol and that the dyes keep the monomer haze- and floc-free at lower concentrations and for longer periods than do either of the phenolic inhibitors.

We claim:
1. A composition of matter consisting essentially of monomeric vinylidene chloride and from 0.006 to 0.1 percent, based on the weight of said monomer, of a monoazo dye which is the diazotization product of a member of the class consisting of aniline, orthotoluidine, and xylidene, coupled with beta-naphthol.

2. The composition claimed in claim 1, wherein the dye is the diazotization product of orthotoluidine coupled with beta-naphthol.

3. The composition claimed in claim 1, wherein the dye is the diazotization product of aniline coupled with beta-naphthol.

4. The composition claimed in claim 1, wherein the dye is the diazotization product of xylidine coupled with beta-naphthol.

References Cited in the file of this patent
UNITED STATES PATENTS
2,160,944    Coleman et al. _____ June 6, 1939